United States Patent
Kim et al.

[11] Patent Number: 6,137,932
[45] Date of Patent: Oct. 24, 2000

[54] APPARATUS FOR CONTROLLING GAIN OF AN OPTICAL FIBER AMPLIFIER AND METHOD THEREOF

[75] Inventors: Myong Wook Kim; Seong Yun Ko; Jae Cheol Jo, all of Seoul, Rep. of Korea

[73] Assignee: Korea Institute of Science and Technology, Seoul, Rep. of Korea

[21] Appl. No.: 09/191,117

[22] Filed: Nov. 13, 1998

[30] Foreign Application Priority Data

Oct. 2, 1998 [KR] Rep. of Korea ................ 98-41647

[51] Int. Cl.[7] .................. G02B 6/34; H04J 14/02; H01S 3/30
[52] U.S. Cl. .................. 385/37; 385/24; 385/42; 359/115; 359/130; 359/341; 372/6
[58] Field of Search ................ 385/37, 39, 42, 385/24; 372/6; 389/130, 115, 134, 341, 345, 346

[56] References Cited

U.S. PATENT DOCUMENTS

| | | | |
|---|---|---|---|
| 5,218,655 | 6/1993 | Mizrahi | 385/39 |
| 5,337,382 | 8/1994 | Mizrahi | 385/37 |
| 5,557,442 | 9/1996 | Huber | 385/37 |
| 5,742,416 | 4/1998 | Mizrahi | 359/134 |
| 5,748,349 | 5/1998 | Mizrahi | 359/134 |
| 5,748,350 | 5/1998 | Pan et al. | 359/130 |
| 5,778,118 | 7/1998 | Sridhar | 385/24 |
| 5,926,300 | 7/1999 | Miyakawa et al. | 359/124 |
| 5,945,666 | 8/1999 | Kersey et al. | 385/37 X |
| 6,031,950 | 2/2000 | Fujita | 385/37 |

OTHER PUBLICATIONS

M. Zirngibl, Electronics Letters, vol. 27, No. 7, pp. 560–561, "Gain Control in Erbium–Doped Fibre Amplifiers by an All–Optical Feedback Loop", Mar. 28, 1991.

H. Okamura, Electronics Letters, vol. 27, No. 23, pp. 2155–2156, "Automatic Optical–Loss Compensation With Er–Doped Fibre Amplifier", Nov. 7, 1991.

H.G. Park, Korean Optics, vol. 8, No. 1, pp. 58–62, "All–Optical Gain Control in Erbium–Doped Fiber Amplifier Using a Fiber Grating", Feb., 1997, (With English Abstract).

E. Delevaque, et al., Electronics Letters, vol. 29, No. 12, pp. 1112–1114, "Gain Control in Erbium–Doped Fibre Amplifiers by Lasing at 1480nm With Photoinduced Bragg Gratings Written on Fibre Ends", Jun. 10, 1993.

*Primary Examiner*—Brian Healy
*Attorney, Agent, or Firm*—Oblon, Spivak, McClelland, Maier & Neustadt, P.C.

[57] ABSTRACT

A method and apparatus for controlling gain of an optical fiber amplifier includes a plurality of optical isolators, an excitation light source, a wavelength division optical fiber coupler, and a special optical fiber. At least one of the optical isolators is disposed at both input and output ports of the optical fiber amplifier so that an input signal light can propagate in one direction. The wavelength division optical fiber coupler couples excitation light from the excitation light source to the input signal light or separates one of the excitation light and the input signal light from the other.

4 Claims, 2 Drawing Sheets

APPARATUS FOR CONTROLLING GAIN OF AN OPTICAL FIBER AMPLIFIER AND METHOD THEREOF

TECHNICAL FIELD

The present invention relates to an optical fiber amplifier, and more particularly, to a method and apparatus for controlling gain of an optical fiber amplifier.

BACKGROUND OF THE INVENTION

Optical fiber amplifiers capable of directly amplifying weak optical signals without conversion of optical signals into electrical signals are known. Such optical fiber amplifiers are typically designed by using an optical fiber doped with a special material such as erbium, and the amplification of weak optical signals is achieved by pumping the erbium-doped optical fiber with a laser. Since this type of erbium-doped optical fiber amplifiers can achieve high gain amplification over a wide range of wavelengths, they have been widely adopted in optical preamplifiers, optical power amplifiers, optical repeaters, and other essential components of optical communication systems based on the 1.55 $\mu$m wavelength. Such erbium-doped optical fiber amplifiers are especially useful in wavelength division multiplex (WDM) communication systems due to their capability to simultaneously amplify optical signals of different wavelengths with little crosstalk.

However, in WDM optical communication systems, the light of a channel signal corresponding to a particular wavelength is arbitrarily modulated in intensity irrespective of other channels during its input or output from an optical fiber communication cable. Consequently, the intensity of the overall signal light input to the optical fiber amplifier varies over a fairly wide range during its operation. In this case, the optical fiber amplifier undergoes gain variations depending on the intensity of the overall input signal light due to gain saturation characteristics, that result in fluctuations of the output light. Such gain instability causes disturbances in the operation of communication systems and is an art recognized problem.

In order to alleviate this problem, a conventional method has been used, which causes the optical fiber amplifier to oscillate at wavelengths other than that of the signal light which produces a laser operation at the wavelength of oscillation. Based on the well known principle that the intensity variation of the oscillation light depends on the intensity variation of the input signal light, the optical fiber amplifier can be stabilized to maintain a constant gain, irrespective of the intensity variation of the input signal light. For example, a gain control method based on a ring resonator type laser, wherein a portion of the output light is fed back to the input port so that loss can be adjusted in the ring is described in an article entitled "Gain control in erbium-doped fibre amplifiers by an all-optical feedback loop" by M. Zirngibl, Electron Lett., 1991, 27, (7), pp.560–561, and in an article entitled "Automatic optical-loss compensation with Er-doped fibre amplifier" by H. Okamura, Electron Lett., 1991, 27, (23), pp.2155–2156.

An alternative method for controlling the gain of the optical fiber amplifier is disclosed in an article entitled "Optical gain control of erbium-doped optical fibre amplifier using an optical fiber grating" by H. K. Park, Korean Optics., February 1997, 8, (1), pp.58–62. In this method, a ring resonator, based on an optical fiber grating and an optical coupler, is used to control gain by tuning the coupling ratio of the optical coupler. Also, a method of using a Fabry-Perot type resonator, which incorporates optical fiber gratings between the input and output ports of the optical fiber amplifier and which oscillates at the wavelengths of reflection of the two optical fiber gratings, is disclosed in an article entitled "Gain control in erbium-doped fibre amplifiers by lasing at 1480 nm with photoinduced Bragg gratings written on fibre ends" by E. Delevaque et al., Electron Lett., 1993, 29, (12), pp.1112–1114.

In the ring type oscillator, however, an optical coupler for use in the ring type resonator, a variable optical attenuator for tuning loss in the resonator and a band-pass filter for selecting the wavelength of oscillation are required. Consequently, the problems arise which are associated with complexity resulting from the increased number of required components and with light loss. Although it is possible to simplify the structure of the optical fiber amplifier according to the Delevaque's method using two optical fiber gratings, gain cannot be easily controlled due to the failure to tune resonator loss. There is a need in the art for an apparatus for controlling gain in optical fiber amplifiers which sloves the problems identified above.

SUMMARY OF THE INVENTION

It is therefore an object of the present invention to provide an apparatus for easily controlling gain of an optical fiber amplifier, which does not cause additional loss and which is simple in structure.

In accordance with the present invention, an apparatus for controlling gain in an optical fiber amplifier is provided which generally includes a plurality of optical isolators, an excitation light source, a wavelength division optical fiber coupler and a special optical fiber. At least one of the optical isolators is disposed at both input and output ports of the optical fiber amplifier so that an input signal light can propagate in one direction. The wavelength division optical fiber coupler couples excitation light from an excitation light source to the input signal light or separates either the excitation light or the input signal light from the other. The special optical fiber is disposed between the optical isolators to transfer energy of the excitation light to the input signal light. The apparatus further comprises at least one optical fiber grating disposed between the special optical fiber and each of the optical isolators, the optical fiber gratings serving as a resonator which oscillates at a predetermined wavelength; and tuning means for tuning a center reflection wavelength detuning between the optical fiber gratings to control gain of the optical fiber amplifier to achieve a desired value.

The above and other features and advantages of the present invention will become apparent from the following description which will be given with reference to the accompanying drawings.

DETAILED DESCRIPTION OF THE PREFERRED EMBODIMENTS

Figure 1:
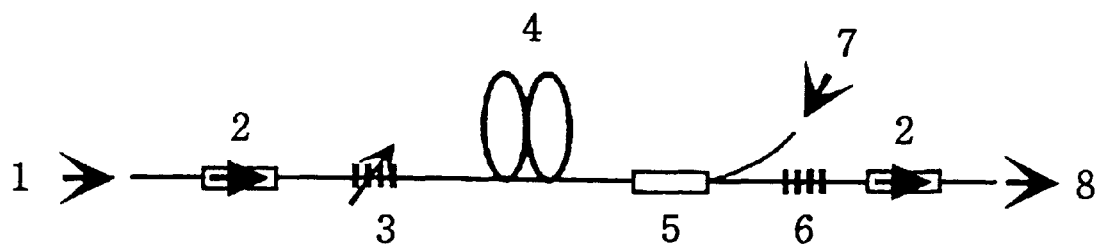
FIG. 1 shows a schematic structure of an optical fiber amplifier having an apparatus for controlling gain thereof according to one embodiment of the present invention.

FIG. 1 shows a schematic structure of an optical fiber amplifier having an apparatus for controlling gain thereof according to one embodiment of the present invention. As shown in FIG. 1, the optical fiber amplifier according to the present invention comprises an input port 1, an optical isolator 2, an optical fiber grating 3 which can be made tensile, a special optical fiber 4, a wavelength division optical fiber coupler 5, an optical fiber grating 6, an excitation light source 7 and an output port 8.

The input port 1 receives an input signal light, and the output port 8 outputs the amplified signal light as an output. The excitation light source 7 generates excitation light, i.e., light energy. Typically, a laser diode is used as the excitation light source 7. The wavelength division optical fiber coupler 5 couples excitation light from the excitation light source 7 to the signal light and separates one of the excitation light and signal light from the other. The optical isolator 2 functions to interrupt the reflected light. The erbium-doped special optical fiber 4 transfers the energy from the excitation light to the signal light.

The optical fiber gratings 3 and 6 serve as resonators for oscillating the optical fiber amplifier. A suitable fiber grating is a Bragg grating. Optical fiber gratings 3 and 6 are disposed between special optical fiber 4 and each of the optical isolators at the input and output ports by fusion splicing. In one embodiment of the present invention, the optical fiber grating 3 at the input port can be made tensile by means of a fine movement mechanism so that the center wavelength of reflection can be variable. The two optical fiber gratings have identical center wavelengths of reflection, for example, 1547.1 nm, and their peak reflectivities may be 0.5 and 0.47, respectively.

With this configuration, oscillation occurs by the optical fiber gratings at both ports, and the optical fiber amplifier has homogeneous line broadening characteristics. Thus, the gain of the optical fiber amplifier is determined by total resonator loss at the wavelength of oscillation. The gain of the optical fiber amplifier in the oscillation state can be defined by following equation (1).

$$G_o(\lambda) = 5\log(1/R_{tot}) + C(\lambda) \quad (1)$$

where $\lambda$ is the wavelength of light, $G_o(\lambda)$ is the gain of the optical fiber amplifier at the given $\lambda$, $C(\lambda)$ is a parameter which reflects the inherent characteristics of the optical fiber amplifier which can have different gains depending on wavelengths, and $R_{tot}$ is the total reflectivity at the wavelength of oscillation which is determined by the center wavelength detuning between the two optical fiber gratings.

Figure 2:
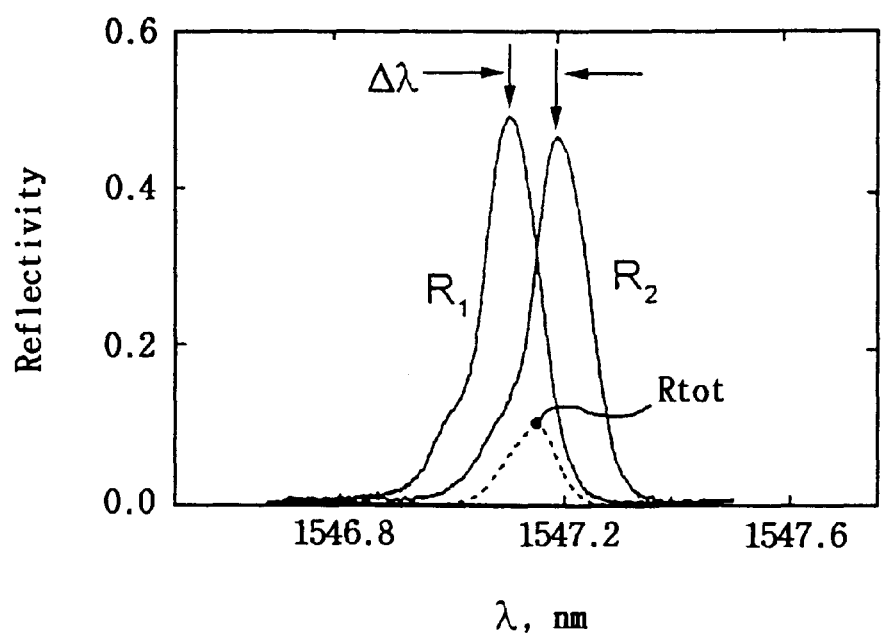
FIG. 2 shows reflection spectra for two optical fiber gratings used in conjunction with the embodiment shown in FIG. 1.

FIG. 2 shows reflection spectra of two optical fiber gratings shown in FIG. 1. The reflection bandwidth of the optical fiber grating is much narrower than the optical fiber amplifier, so that oscillation occurs at the wavelength of peak reflectivity. Assuming that the total light loss of the resonator depends only on reflection spectra of the optical fiber grating, the total reflectivity $R_{tot}$ is determined by the following equation (2).

$$R_{tot} = MAX\{R_1(\lambda)R_2(\lambda)\} \quad (2)$$

where $R_1(\lambda)$ and $R_2(\lambda)$ are the reflection spectra of the two gratings, and $\lambda$ is the wavelength of oscillation when $R_{tot}$ is the peak value of the products of reflection spectra of the two optical fiber gratings. It can be appreciated from the shape of the reflection spectra that the total reflectivity takes a maximum when the center wavelengths of the two optical fiber gratings are identical and is reduced as the center wavelength detuning increases. Thus, from equations (1) and (2), it can be seen that the gain of the optical fiber amplifier is determined by the center wavelength detuning between the two optical fiber gratings. When the center wavelengths of the two optical fiber gratings differ enough to cause the total reflectivity to be below the threshold value of lasing, the gain is maximized. On the other hand, when the center wavelengths are identical, the gain is minimized.

Figure 3:
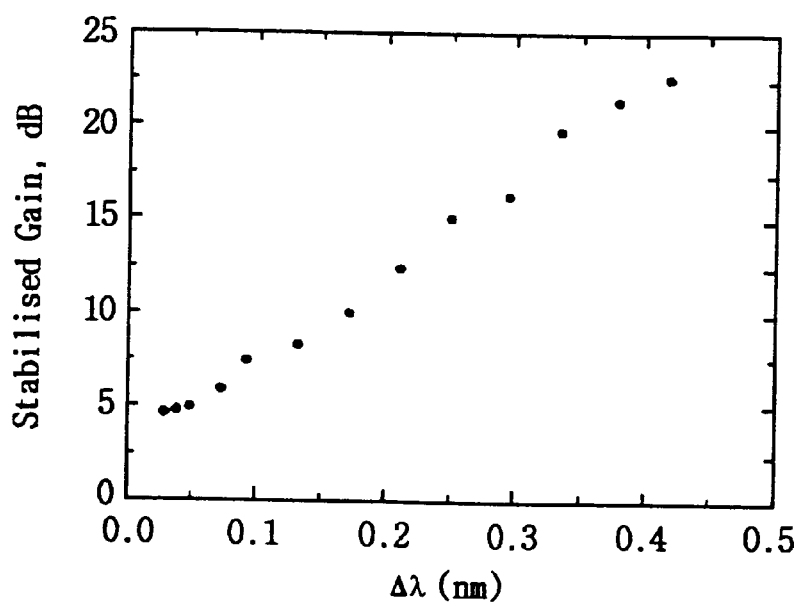
FIG. 3 is a diagram showing gain characteristics based on differences between center wavelengths of reflection of the two optical fiber gratings shown in FIG. 1.
Figure 4:
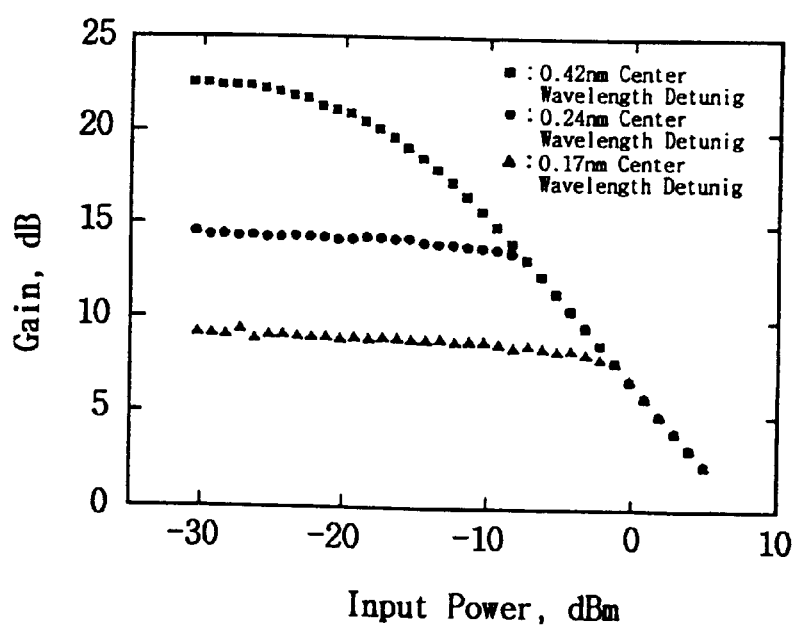
FIG. 4 is a diagram showing gain characteristics that depend on input signal powers for various differences between the center wavelengths of reflection of two optical fiber gratings shown in FIG. 1.

FIG. 3 is a diagram showing gain characteristics depending on the differences between the center wavelengths of reflection of the two optical fiber gratings shown in FIG. 1. FIG. 4 is a diagram showing gain characteristics depending on input signal powers for various differences between the center reflection wavelengths of the two optical fiber gratings shown in FIG. 1. As shown in FIGS. 3 and 4, the gain of the optical fiber amplifier can be controlled by tuning the center wavelength detuning between the two optical fiber gratings 3 and 6.

As described above, the center wavelength of reflection of the optical fiber grating 3 becomes variable with respect to the center wavelength of the optical fiber grating 6 by adjusting the tensile strength of the optical fiber grating at the input port. Light loss in the resonator is controlled by tuning the center wavelength detuning between the two optical fiber gratings 3 and 6 so that the gain of the optical fiber amplifier can be controlled to desired values.

In accordance with an apparatus for controlling gain of the optical fiber amplifier according to the present invention, the gain of the optical fiber amplifier can be controlled without any additional light loss which otherwise may have been caused by the increased number of required components.

Although the present invention has been described hereinabove with reference to a preferred embodiment thereof, it is to be understood that the invention is not limited to such embodiments alone, and a variety of other changes and modifications will be apparent to those skilled in the art without departing from the spirit of the invention.

What is claimed is:

1. An apparatus for controlling gain of an optical fiber amplifier which includes a plurality of optical isolators, an excitation light source, a wavelength division optical fiber coupler and a special optical fiber, wherein at least one of said optical isolators is disposed at both input and output ports of said optical fiber amplifier so that an input signal light can propagate in one direction; said wavelength division optical fiber coupler couples excitation light from said excitation light source to the input signal light or separates one of the excitation light and the input signal light from the other; and said special optical fiber is disposed between said optical isolators so as to transfer energy of the excitation light to the input signal light, said apparatus comprising:

- at least one optical fiber grating disposed between said special optical fiber and each of said optical isolators, said optical fiber gratings serving as a resonator which oscillates at a predetermined wavelength; and
- tuning means for tuning a center reflection wavelength detuning between said optical fiber gratings to control said gain of said optical fiber amplifier to have a desired value.

2. The apparatus for controlling gain of an optical fiber amplifier according to claim 1, wherein said tuning means includes means for controlling tensile strength of at least one of said optical fiber gratings.

3. A method of controlling gain of an optical fiber amplifier which includes a plurality of optical isolators, an excitation light source, a wavelength division optical fiber coupler and a special optical fiber, wherein at least one of said optical isolators is disposed at both input and output ports of said optical fiber amplifier so that an input signal light can propagate in one direction; said wavelength division optical fiber coupler couples excitation light from said excitation light source to the input signal light or separates one of the excitation light and the input signal light from the other; and said special optical fiber is disposed between said optical isolators so as to transfer energy of the excitation light to the input signal light, said method comprising the steps of:

- disposing at least one optical fiber grating between said special optical fiber and each of said optical isolators, said optical fiber gratings serving as a resonator which oscillates at a predetermined wavelength; and
- tuning a center reflection wavelength detuning between said optical fiber gratings to control gain of said optical fiber amplifier to have a desired value.

4. The method of controlling gain of an optical fiber amplifier according to claim 3, wherein said tuning step includes controlling tensile strength of at least one of said optical fiber gratings.

* * * * *